United States Patent
Cox et al.

(10) Patent No.: US 9,261,647 B1
(45) Date of Patent: Feb. 16, 2016

(54) METHODS OF PRODUCING STRAIN IN A SEMICONDUCTOR WAVEGUIDE AND RELATED DEVICES

(71) Applicant: Sandia Corporation, Albuquerque, NM (US)

(72) Inventors: Johnathan Albert Cox, Albuquerque, NM (US); Peter Thomas Rakich, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 102 days.

(21) Appl. No.: 14/012,877

(22) Filed: Aug. 28, 2013

(51) Int. Cl.
*G02B 6/12* (2006.01)
*G02B 6/10* (2006.01)

(52) U.S. Cl.
CPC .............. *G02B 6/12* (2013.01); *G02B 6/12014* (2013.01); *G02B 6/12009* (2013.01); *G02B 6/12011* (2013.01)

(58) Field of Classification Search
CPC .............. G02B 6/12; G02B 6/34; G02B 6/13; G02B 6/12009; G02B 6/1225; G02B 6/12011; G02B 6/12014
USPC ........................ 385/4, 10, 14, 28, 29, 49, 125, 385/129–132, 141, 142, 144
See application file for complete search history.

(56) References Cited

U.S. PATENT DOCUMENTS

| | | | | |
|---|---|---|---|---|
| 5,061,028 | A * | 10/1991 | Khanarian et al. | 385/132 |
| 8,600,200 | B1 * | 12/2013 | Rakich et al. | 385/7 |
| 2003/0118292 | A1 * | 6/2003 | Kitaoka et al. | 385/91 |
| 2007/0297734 | A1 * | 12/2007 | Ibanescu et al. | 385/125 |

OTHER PUBLICATIONS

Cazzanelli et al., Second-Harmonic Generation in Silicon Waveguides Strained by Silicon Nitride, Nature Materials, Dec. 4, 2011, pp. 1-7.
Derose et al., "Ultra Compact 45 GHZ CMOS Compatible Germanium Waveguide Photodiode With Low Dark Current", Optics Express, Dec. 5, 2011, vol. 19., No. 25.
Driscoll et al., "Width Modulation of Si Photonic Wires for Quasi-Phase Matching of Four-Wave Mixing: Experimental and Theoretical Demonstration", Opt. Exp. Apr. 2012 vol. 20 No. 8.
Hon et al., "Periodically Poled Silicon", Applied Physics Letters, 94, 091116 (2009).
Jacobsen et al., "Strained Silicon as a New Electro-Optical Material", Nature, May 2006, vol. 44, pp. 199-202.
Jones et al., "Silicon-On-Sapphire Integrated Waveguides for the Mid-Infrared," Optics Express, May 24, 2010, vol. 18, No. 12.

(Continued)

*Primary Examiner* — Kaveh C Kianni
*Assistant Examiner* — Hung Lam
(74) *Attorney, Agent, or Firm* — Martin I. Finston

(57) ABSTRACT

Quasi-phase matched (QPM), semiconductor photonic waveguides include periodically-poled alternating first and second sections. The first sections exhibit a high degree of optical coupling (abbreviated "$X^2$"), while the second sections have a low $X^2$. The alternating first and second sections may comprise high-strain and low-strain sections made of different material states (such as crystalline and amorphous material states) that exhibit high and low $X^2$ properties when formed on a particular substrate, and/or strained corrugated sections of different widths. The QPM semiconductor waveguides may be implemented as silicon-on-insulator (SOI), or germanium-on-silicon structures compatible with standard CMOS processes, or as silicon-on-sapphire (SOS) structures.

37 Claims, 3 Drawing Sheets

(56) References Cited

OTHER PUBLICATIONS

Laurell, F., "Periodically Poled Materials for Miniature Light Sources", Optical Materials 11, Jan. 1999, pp. 235-244.

Shin et al., "Tailorable Stimulated Brillouin Scattering in Nanoscale Silicon Waveguides", Nature Communications, Jun. 6, 2013, pp. 1-10.

Soref, R., "Mid-Infrared Photonics in Silicon and Germanium", Nature Photonics, Aug. 2010, vol. 4, pp. 495-497.

* cited by examiner

METHODS OF PRODUCING STRAIN IN A SEMICONDUCTOR WAVEGUIDE AND RELATED DEVICES

GOVERNMENT LICENSE RIGHTS

This invention was developed under Contract DE-AC04-94AL85000 between Sandia Corporation and the U.S. Department of Energy. The U.S. Government has certain rights in this invention.

INTRODUCTION

It has previously been proposed to use common crystalline semiconductor materials as photonic waveguides in the near infrared. For example, Soref, "Mid-Infrared Photonics in Silicon and Germanium," Nature Photonics, vol. 4, pp. 495-497 (August 2010), points out that silicon and germanium are potentially ideal for the generation and manipulation of light on chips in medium wavelength infrared (MWIR) to long wavelength infrared (LWIR) applications (e.g., 3-12 µm), because silicon and germanium are optically transparent in these regions. Most materials are not optically transparent in these regions or are difficult to integrate and manufacture.

In addition, it has previously been proposed to use induced-strain to achieve second order harmonic generation (SHG) effects in a silicon waveguide. For example, Cazzanelli et al., "Second-Harmonic Generation in Silicon Waveguides Strained by Silicon Nitride," Nature Materials, DOI: 10.1038 (December 2011) (hereafter "Cazzanelli") appears to describe SHG effects obtained by inducing a strain gradient that non-uniformly distorts the crystal lattice of a silicon waveguide. Jacobsen et al., "Strained Silicon as a New Electro-Optic Material," Nature, vol. 441/11, DOI 10.1038 (May 2006), also appears to describe a linear Pockels electro-optic effect achieved by inducing strain in a silicon waveguide.

Although waveguides with SHG effects have numerous potential applications, the strain gradient effect described in Cazzanelli appears to have several disadvantages. First, the SHG effect only occurs at wavelengths of 2 µm to 1 µm that have no significant commercial applications. Second, the efficiency of the conversion is poor, due to the lack of phase matching methods which results in coherent and constructive build up of power from a pump wavelength (e.g., 2 µm) to a generated output optical wavelength (e.g., 1 µm). Third, the conversion of light in the silicon-on-insulator structures described by Cazzanelli are limited to wavelengths of 1 to 2 µm due to absorption by the silicon at 1 µm and absorption by the insulator ($SiO_2$) at 2.2 µm.

One way to avoid the limitations of the strain gradient effect described in Cazzanelli is to apply quasi-phase matching (QPM) techniques to strained silicon waveguide structures, as described in Hon et al., "Periodically Poled Silicon," Applied Physics Letters, 94, 091116-1 (March, 2009)(hereafter "Hon"). The waveguide structure described by Hon appears to use high-stress silicon nitride films of alternating compressive and tensile strain directions to reverse the sign of an optical mode coupling coefficient effect (hereafter referred to using the symbol "$X^2$") in alternating waveguide sections, and thereby provide both phase matching and second order effects. However, the structures described by Hon appear to be difficult to manufacture, and do not appear to offer long wave infrared transparency. Still further, Hon's alternating strains appear to apply high stresses on silicon structures, which can lead to defects or even failure of the crystal structure (e.g., cracking).

Accordingly, it is desirable to provide semiconductor waveguides with strain-induced second order optical effects that overcome the disadvantages of existing waveguides.

Further, it is desirable to provide semiconductor waveguides that utilize the optical transparency and integration properties of common semiconductor materials, such as silicon and germanium, and that combine QPM and various strain-inducing techniques to achieve both a desired wavelength range and second order optical effects without requiring application of both tensile and compressive stress to a waveguide.

SUMMARY

Embodiments of invention described herein eliminate the need to reverse or "flip" the sign of an optical mode coupling coefficient, $X^2$. This is made possible because the inventors recognized that silicon and germanium do not naturally exhibit a $X^2$ effect. Therefore, second order optical effects can be achieved by applying a high strain only to alternating sections of a waveguide that have a high $X^2$ while reducing or eliminating strain in sections that do not have a high $X^2$.

Elimination of the need to flip the sign of the $X^2$ effect may be achieved, in various embodiments of the invention, by providing strained semiconductor waveguide structures having periodically, alternating sections of high and low optical mode coupling between the pump, idler, and output waves, i.e., alternating first sections having a high value of $X^2$ and second sections having a zero or negligibly small value of $X^2$. In embodiments of the invention, in order to achieve QPM, a period of the alternating sections should be a multiple of the inverse phase mismatch between the pump, idler, and signal or output waves in the waveguide.

High $X^2$ first sections, i.e., sections in which there is a high degree of coupling, between pump, signal, and idler waves in the waveguide, may have a strain that is induced by a high compressive or tensile stress film or by lattice and/or thermal mismatches, i.e., differences in coefficient of thermal expansion, between the crystalline material of the waveguide and the material of the substrate (i.e., a high degree of coupling, between pump, signal, and idler waves in the waveguide). The first sections may have a high optical mode coupling coefficient, $X^2$, so as to achieve second order optical effects. In contrast, the low $X^2$ second sections may be sections in which no strain is induced or sections made of a material or having dimensions or width that do not result in a high $X^2$ effect when strain is induced.

Alternatively, the high and low $X^2$ sections may comprise alternating sections of differing width. Further, a uniform strain may be applied to each of the first and second sections. The variations in width of the waveguide may be achieved by forming the waveguide with corrugations.

More particularly, in one embodiment a phase matched, strained semiconductor waveguide that exhibits second order effects may comprise a semiconductor waveguide body having a plurality of periodically alternating, strained first sections and second sections. The strained first sections may have a high optical mode coupling coefficient and comprise a crystalline semiconductor material such as crystalline silicon. The second sections, made of a material such as amorphous silicon, may have a lower optical mode coupling coefficient than the strained first sections. Further, a period of said first and second sections may be a multiple of an inverse phase mismatch between the pump, signal, and idler waves, evaluated as a difference between the pump wavevector and the sum of the signal and idler wavevectors in the waveguide.

The semiconductor waveguide body may comprise silicon, and may further comprise a body suspended over an air gap in an insulating substrate to form a silicon-on-insulator (SOI) waveguide structure. Strain may be induced by suspending the waveguide body in a high-stress membrane formed of, e.g., silicon nitride, over the air gap. The semiconductor waveguide body may additionally comprise a body formed on an optically transparent substrate formed of, e.g., sapphire, wherein a lattice and/or thermal mismatch between the crystalline semiconductor material of the first sections and the optically transparent substrate induces strain in the semiconductor waveguide. When the optically transparent substrate is sapphire, a silicon-on-sapphire (SOS) structure may be formed.

Additionally, the waveguide may comprise a stress-inducing material such as silicon nitride formed on at least the first sections to induce a strain in the first sections.

In additional embodiments a strained semiconductor waveguide may comprise a high-stress layer formed of, e.g., silicon nitride, formed on high-stress sections, wherein strain in the first sections is increased by the high-stress layer formed on high-stress sections formed of, e.g., crystalline silicon.

In an alternative embodiment, a semiconductor waveguide body may comprise germanium. Accordingly, the waveguide may further comprise a substrate formed of, e.g., silicon, on which the germanium waveguide body is formed. Strain may be induced by a lattice and/or thermal mismatch between the germanium waveguide body and the substrate. A stress-inducing layer may be formed of, e.g., silicon nitride, on the germanium waveguide body. The stress-inducing layer may induce a strain in at least first sections of the waveguide formed of, e.g., crystalline germanium, in addition to the strain induced by a thermal mismatch between the germanium waveguide body and the substrate. The waveguide may further comprise second sections formed of, e.g., amorphous germanium.

Similar to embodiments described previously, the phase matched strained semiconductor waveguide of this embodiment may comprise a high-stress layer formed of, e.g., silicon nitride, on at least the crystalline germanium, wherein strain in the first sections is increased by the high-stress layer formed on at least the crystalline germanium.

In addition to the devices set forth above, the present invention further provides for waveguides that comprise a semiconductor waveguide body (e.g., silicon) having a plurality of periodically alternating first and second sections and an induced strain, wherein the silicon waveguide body may be corrugated to have alternating first and second sections of different width. A poling period of the first and second sections may be the inverse of a difference between the pump wavevector and the sum of the signal and idler wavevectors.

The waveguide may further comprise a stress-inducing material formed on the corrugated semiconductor waveguide body to induce the strain, and a substrate (e.g., sapphire), wherein strain is induced in the corrugated silicon waveguide body by a lattice and/or thermal mismatch between the silicon waveguide body and the substrate.

An alternative, strained semiconductor waveguide may comprise germanium instead of silicon. If so, strain may be induced in the semiconductor by a lattice and/or thermal mismatch between the germanium waveguide body and a substrate such as a silicon substrate.

The present invention provides methods for applying or inducing strain, either compressively or through tensile methods, by (for example): (a) forming a high stress film on at least the high $X^2$ (first) sections of the waveguide, (b) creating lattice and/or thermal mismatches between crystalline sections of the waveguide and a substrate, or (c) some combination of (a) and (b). Lower $X^2$ (second) sections of a waveguide may be sections to which high stress film has not been applied, or sections with a lower or higher width than high $X^2$ sections, and/or sections made of a material with a lower $X^2$ effect or reduced lattice and/or thermal mismatch relative to the substrate, such as an amorphous form of the high $X^2$ crystalline material in the high-strain sections.

In particular, one method of producing strain in a semiconductor waveguide may comprise forming a semiconductor waveguide body comprising a plurality of alternating, strained first sections and second sections with a periodicity that is a multiple of an inverse of the difference between the pump wavevector and the sum of signal and idler wavevectors in the waveguide. The strained first sections may comprise a crystalline semiconductor material having a high optical mode coupling coefficient (i.e., $X^2$), while the second sections may comprise a material having a lower optical mode coupling coefficient than the strained first sections.

The method may further comprise inducing strain in the first sections by: (i) applying a high-stress material to at least the first sections, or (ii) inducing strain in the first sections by forming the waveguide body on a substrate having a lattice and/or thermal mismatch with the waveguide body, or (iii) inducing additional strain in the first sections by applying a high-stress material to at least the first sections.

The second sections may be formed by forming gaps in the crystalline semiconductor material, and forming an amorphous semiconductor material in the gaps.

Yet another method may comprise: forming a corrugated semiconductor waveguide body comprising a plurality of corrugated sections having a periodicity that is a multiple of e in the waveguide, and inducing a strain in the corrugated semiconductor waveguide body.

In this method, strain may be induced by: (i) forming the corrugated semiconductor waveguide body on, or in, a membrane of high-stress material, or (ii) forming the corrugated semiconductor waveguide body on, or in, a membrane of material having a lattice and/or thermal mismatch with the material of the corrugated semiconductor waveguide body.

DETAILED DESCRIPTION, INCLUDING EXAMPLES

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

It should be further noted that some exemplary embodiments may be described and claimed as a process or method (hereafter "method"). Though a method may be described and claimed as set of sequential steps, it should be understood that the steps may be performed in parallel, concurrently or simultaneously. In addition, the order of each step within a method may be re-arranged. A method may be terminated when completed, and may also include additional steps not necessarily described herein. A method may correspond to functions or processes completed by a physical system.

As used herein, the term "and/or" includes any and all combinations of one or more of the associated listed items. It should be understood that if an element is referred to, or depicted, as being positioned "on", or "over" another element (or similar language) it may be completely on, or over, the other element or substantially on, or over, the other element, unless otherwise specified or understood by the context of the description or drawings. As used herein, the singular forms "a," "an" and "the" are not intended to include the plural form unless the context clearly indicates otherwise.

Figure 1:
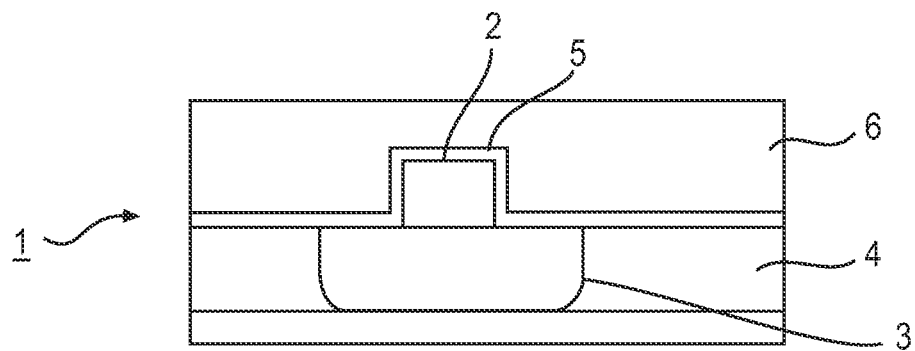
FIG. 1 is a cut-away front view of an SOI wafer including a strained semiconductor waveguide constructed according to embodiments of the invention.
Figure 2:
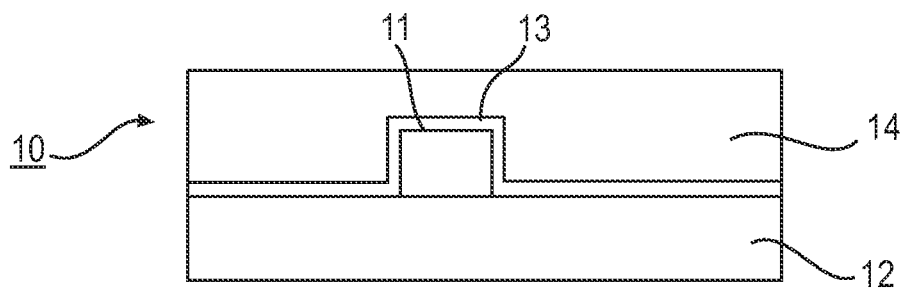
FIG. 2 is a cut-away front view of an SOS wafer including a strained semiconductor waveguide constructed according to embodiments of the invention.
Figure 3:
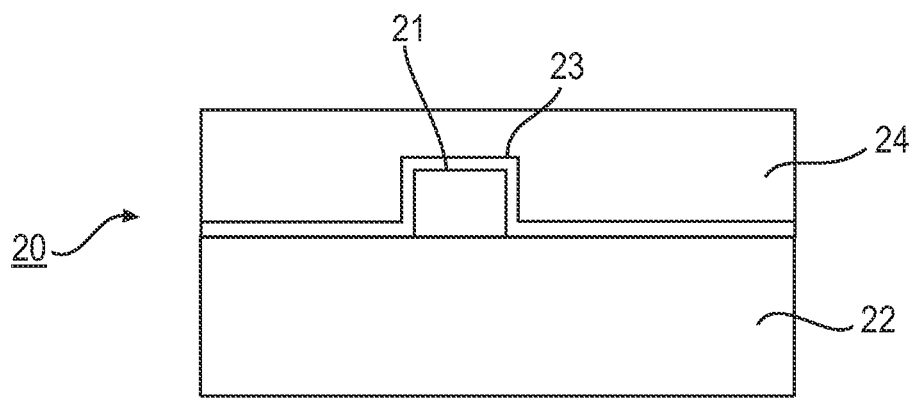
FIG. 3 is a cut-away front view of an SOI wafer with a germanium waveguide including a strained semiconductor waveguide constructed according to embodiments of the invention.

As used herein, the term "embodiment" refers to an example of the present invention. As shown in FIGS. 1-3, the principles of the invention may be applied to SOI, SOS, and other semiconductor wafers or structures of various types. The invention is, however, not intended to be limited to these three types of structures, Rather, the principles of the invention may be applied to any semiconductor structure or other product that includes a semiconductor waveguide, and in which alternating high and low (or no) $X^2$ sections may be formed or arranged as illustrated in FIGS. 4-7.

Referring to FIG. 1, there is depicted an SOI wafer 1 according to one embodiment of the invention in which a silicon waveguide may be suspended over an air gap 3 formed in an insulator or substrate 4 according to the principles set forth in FIGS. 4-7. The silicon waveguide 2, air gap 3, and insulator 4 may all be made of conventional materials using conventional semiconductor wafer manufacturing and growth processes. An exemplary material for the insulator or substrate 4 is $SiO_2$, but the invention is not limited to a particular insulator.

As illustrated in more detail in FIGS. 4-7, a high stress film 5 may be applied atop at least sections of the silicon waveguide 2, and may also be formed on the air gap 3 and insulator 4. A suitable material for the high stress film 5 is silicon nitride (SiN) because it exhibits low loss out to a wavelength of 6 μm. That said, other materials may be used that have a stress inducing effect with low loss at wavelengths in the LWIR range higher than 6 μm. In accordance with an embodiment of the invention, the high stress film 5 may apply either a compressive or tensile stress, depending on the properties of the material that makes up the high stress film 5 and the desired properties of the waveguide.

The air gap 3 may be formed by etching out a space beneath the waveguide 2 according to known methods, leaving the waveguide 2 suspended atop the air gap 3 in a highly strained state. The formation of the air gap 3 ensures that optical modes confined in the silicon waveguide 2 will not interact with the high loss substrate 4.

An optional protective layer 6 may be formed over the stress-inducing film 5 using known materials and protective layer forming methods. For example, suitable materials may include aluminum oxide, polymers, or even a silicon nitride material that does not induce significant stress or optical absorption at MWIR or LWIR wavelengths. In addition, those skilled in the art will appreciate that, in any of the wafers illustrated in FIGS. 1-3, additional layers or structures may be provided between, or on, any of the illustrated layers according to conventional semiconductor manufacturing techniques. Furthermore, those skilled in the art will appreciate that the various layers in each of FIGS. 1-7 are illustrated in schematic form, which is not intended to be an accurate depiction of relative dimensions or shape.

FIG. 2 depicts another embodiment of the invention. In this embodiment a wafer 10 includes a silicon waveguide 11 that may be formed on an optically transparent substrate 12 (instead forming an air gap beneath the silicon waveguide 11). A high stress film 13 may also be applied (e.g. silicon nitride) to the silicon waveguide as described above in connection with FIG. 1. In this example, wavelength limitations may be determined by the material of the substrate. If the wafer is an SOS wafer with a sapphire ($Al_2O_3$) substrate, for example, then optical transparency extends to wavelengths of approximately 7 μm, although those skilled in the art will appreciate that other optically transparent substrate materials, such as diamond, may be substituted for the sapphire in the optically transparent substrate 12.

As in the embodiment of FIG. 1, the silicon waveguide 11 and optically transparent substrate 12 may be made of conventional materials using conventional semiconductor wafer manufacturing and growth processes. Further, an optional protective layer 14 may be formed over the stress-inducing film 13 using known materials and protective-layer-forming methods.

FIG. 3 depicts a semiconductor wafer 20 in which a germanium waveguide 21 may be formed directly on a silicon substrate 22 according to yet another embodiment of the invention. Germanium is optically transparent at a wavelength of 14 μm, in contrast to silicon which is typically optically transparent at wavelengths of 7-10 μm. The germanium waveguide 21 and silicon substrate 22 may be made using conventional semiconductor wafer manufacturing and growth processes. In this embodiment, the formation of single crystal germanium on silicon induces a strain in the germanium waveguide 21 of approximately 0.3 to 4.0% due to lattice mismatches and thermal expansion mismatches. Nevertheless, an additional stress inducing film 23 may optionally be formed on the germanium waveguide 22, to alter the properties of the germanium waveguide 22 according to the principles of the embodiments illustrated in FIGS. 4-7. This embodiment has the advantage that it does not require a costly transparent substrate material, such as sapphire, or formation of an air gap structure that may be more expensive to produce, and may be more fragile than a solid substrate structure.

FIGS. 4-7 illustrate exemplary, inventive methods or arrangements for applying a desired stress pattern to the optical waveguides of FIGS. 1-3. There are two primary methods, variations of which are illustrated respectively in FIGS. 4-5 and 6-7, which may be applied to any of the exemplary waveguides illustrated in FIGS. 1-3.

In each of the methods and/or arrangements illustrated in FIGS. 4-7, a waveguide may be formed with alternating first and second sections with respective high $X^2$ coupling coefficient values and zero or negligibly small $X^2$ coupling coefficient values, and whose respective dimensions achieve QPM.

In order to achieve QPM, the spatial period Λ and the difference between the pump wavevector and the sum of signal and idler wavevectors must generally satisfy the inverse relationship:

$$\Delta k = k_P - k_S - k_I - 2\pi m/\Lambda \equiv 0$$

$$\Lambda \equiv 2\pi m/\Delta k \quad (1),$$

That is, the periodicity of the alternating arrangement is an inverse multiple of the difference, Δk, where m is a positive integer. The periodicity may be determined by any known QPM technique, such as by calculating the wave vectors, $k_P$, $k_S$ and $k_I$, at the wavelengths of the pump, signal and idler waves in the specific waveguide of interest. This QPM "poling" period is determined by the specific materials and geometry of the device, as well as the optical frequencies of interest, with a length associated with a typical poling period comprising a few microns. For typical MWIR/LWIR wavelengths and pump wavelengths in the near infrared (NIR) range of 2-3.5 μm, the QPM poling period may be on the order of 1-10 μm.

Figure 4:
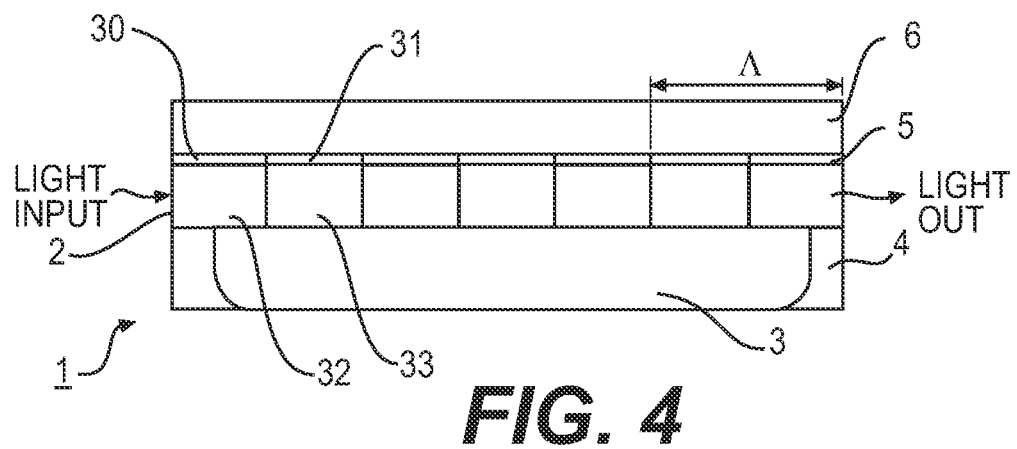
FIG. 4 is a cross-sectional side view of a phase matched strained semiconductor waveguide constructed in accordance with an embodiment of the invention.
Figure 5:
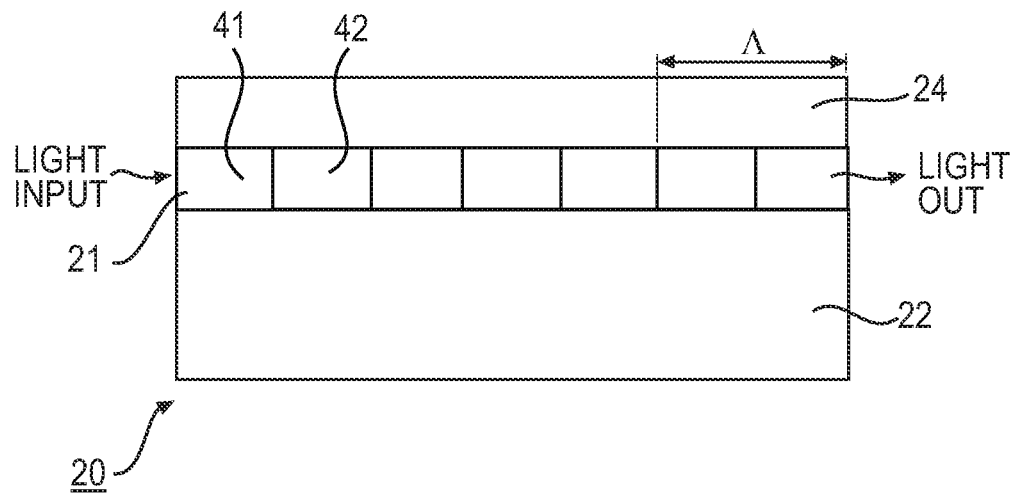
FIG. 5 is a cross-sectional side view of a phase matched strained semiconductor waveguide constructed in accordance with another embodiment of the invention.

Once a suitable poling period has been determined, the alternating high and low $X^2$ sections can be implemented in a variety of ways. FIGS. 4 and 5 depict a waveguide that comprises alternating strained and unstrained (or non-crystalline) sections of material. In this way, coherent conversion of light from a pump to a signal or idler wave occurs in the strained section, at which point second order nonlinearities are shut off or disabled while the waves come back into phase.

Referring now specifically to FIG. 4 there is depicted a side view of an SOI wafer structure 1 of the type illustrated in FIG. 1. Reference numerals in FIG. 4 that are also included in FIG. 1 indicate the same elements and, to the extent not discussed below, are discussed above in connection with FIG. 1.

As shown in FIG. 4, a high-stress, strain inducing film 5 may be divided into stress-inducing portions 30 that alternate with low stress-inducing or non-stress-inducing portions 31, which may be in the form of layers made of a material with low stress properties, i.e., with lattice and/or thermal properties that match that of the waveguide material, or which may simply be gaps in the strain-inducing film 5. This arrangement of the strain-inducing film 5 results in alternating waveguide sections 32 and 33 with respective high and low $X^2$ properties. The low-stress region exhibits a negligible $X^2$ effect when the waves are out of phase, and, therefore, no energy from signal and idler waves is transferred back to the pump.

The alternating high and low stress layer technique illustrated in FIG. 4 can be applied to either silicon or germanium waveguides. In the case of germanium waveguides (FIG. 3) in which strain is induced by the lattice and/or thermal mismatches between the germanium waveguide and the silicon substrate, the alternating high and low stress layers may be used to enhance phase matching while counteracting and/or enhancing the strain induced by the lower germanium/silicon interface.

FIG. 5 depicts a variation of the embodiment of FIG. 4. Instead of, or in addition to, alternating between high-strain and negligible-strain sections, the material of the waveguide itself alternates between strained crystalline and negligible-strain amorphous waveguide sections. As shown in FIG. 5, a crystalline material 41, illustrated as crystalline germanium, may be epitaxially deposited atop a silicon substrate 22, and patterned to include alternating gaps and waveguide sections 41. The gaps may then be filled with a low $X^2$ material 42 such as amorphous germanium, which is not crystalline and, therefore, lacks $X^2$ effects.

In the alternating-material embodiment of FIG. 5, an analogous approach can be taken for silicon waveguides, where alternating sections of crystalline silicon (c-Si) and amorphous silicon (a-Si) may be deposited in place of a purely crystalline silicon waveguide. A straining film may also be deposited atop the alternating crystalline and amorphous sections of the waveguide. In this example, the silicon waveguide may rest on either an optically transparent substrate, such as the sapphire substrate 12 shown in FIG. 2, or in a membrane, such as a silicon nitride membrane, that is suspended over an air gap (such as air gap 3 shown in FIG. 1).

Figure 6:
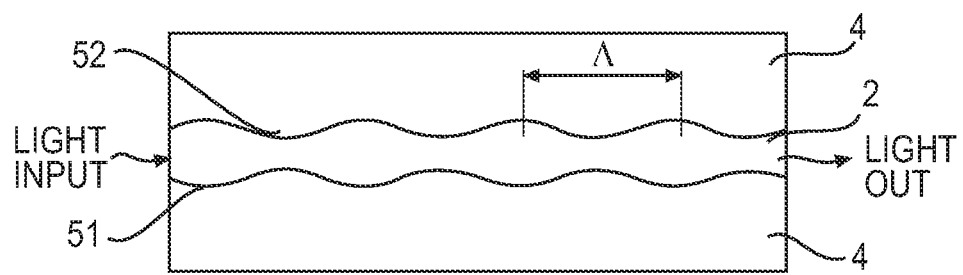
FIGS. 6 and 7 are top views of phase matched strained semiconductor waveguides constructed in accordance with yet another embodiment of the invention.
Figure 7:
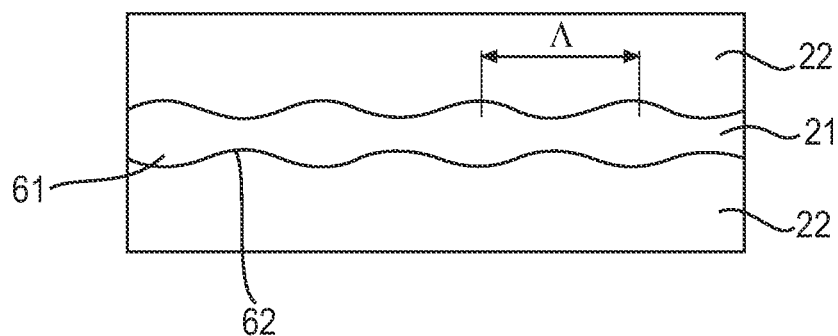

In the embodiment depicted in FIGS. 6 and 7, instead of alternating high and low strain regions, or crystalline and amorphous regions (both of which may require extra manufacturing steps to achieve the alternating pattern), the inventive semiconductor waveguides may be subject to a non-alternating stress, and high and low $X^2$ effects by "corrugating" the waveguide, i.e., by periodically varying the width of a waveguide. The effect is to perturb the intensity and wave vector of propagating light waves. For example, as the waveguide becomes wider, the intensity decreases as the optical mode expands, and the effective strength of the nonlinear interaction weakens. Furthermore, the wave vectors of the modes are increased as the optical confinement increases due to increasing waveguide width.

These effects act to periodically perturb the phase of the propagating optical waves, and break the symmetry of conversion of energy from pump to signal and idler, and then back into the pump wavelength. For example, if the conversion occurs in a narrow region, then back conversion in a wide region will occur at a reduced level due to the reduced magnitude of the phase match and/or reduced optical intensity. The conversion and reduced back conversion may be repeated until significant pump conversion is achieved.

As in the embodiments of FIGS. 4 and 5, the poling period Λ for the corrugations of FIGS. 6 and 7 may be chosen to account for the phase mismatch of the uncorrugated waveguide, i.e., by selecting the poling period as a multiple of the inverse phase mismatch between pump, signal, and idler waves in the waveguide according to QPM poling techniques described herein.

Both silicon and germanium waveguides may be corrugated. FIG. 6 illustrates a silicon-on-insulator waveguide 2 of the type shown FIG. 1. The silicon waveguide 2 is corrugated to form relatively thicker sections 51 and thinner sections 52. A high stress film (not shown) may be applied to induce strain in at the thinner sections 52, which have a relatively higher optical coupling coefficient. Alternatively, in the case of a silicon-on-sapphire waveguide of the type shown in FIG. 2, strain may be induced in the thicker sections by a lattice and/or thermal mismatch between the waveguide material and substrate, with or without the addition of a high stress film. The high stress film may again be silicon nitride. Additional details of the arrangement shown in FIG. 6 may be found in the discussion of FIGS. 1 and 2.

In the case of a germanium waveguide, as illustrated in FIG. 7, strain may be induced in the thinner sections 62 by the lattice and/or thermal mismatch between silicon substrate 22 and germanium waveguide material 21, as described above in connection with FIG. 3. The thicker sections in this embodiment are indicated by reference numeral 61.

In each of the embodiments of FIGS. 6 and 7, the depth of the corrugations may be limited by optical scattering loss. For example, the depth may be limited to 10 nm to 100 nm. Because of this, the required waveguide length may need to be increased relative to the examples of FIGS. 4 and 5. Furthermore, at some wavelengths, it is possible that the corrugations may act as a Bragg mirror grating and reflect the optical waves. This effect might be utilized to create, for example, an optical parametric oscillator or for other reasons. However, this effect may be undesirable. If undesirable, the embodiments of FIG. 4 or 5 may be preferred over those of FIGS. 6 and 7 for certain combinations of wavelength, materials, and device structures (e.g., in which Bragg mirror grating effects occur).

The inventive, alternating high and low $X^2$ waveguide structures described herein may be employed in a variety of high-efficiency, on-chip IR waveguide applications, including sum-frequency generation, difference frequency generation (DFG) and parametric amplification and oscillation on an integrated, semiconductor photonics platform. In this way, for example, on-chip optical parametric oscillators, amplifiers or DFG for mid-infrared frequency generation may be provided for military countermeasures such as missile jamming, sensing and communications, as well as spectroscopy. In addition, parametric amplification using the embodiments described herein may enable on-chip, low-cost, compact, and low-power CMOS-compatible generation of entangled photon pairs for quantum key distribution (QKD) so as to provide a both mid-infrared frequency generation and QKD owing to the high optical efficiency of QPM.

Having thus described embodiments of the invention, it will nevertheless be appreciated that numerous variations and modifications of the illustrated embodiments may be made without departing from the spirit of the invention. Rather, the scope of the invention should be defined in accordance with the appended claims.

What is claimed is:

1. A phase matched strained semiconductor waveguide that exhibits second order effects, comprising:
   a semiconductor waveguide body having a plurality of periodically alternating, strained first sections and second sections, wherein:
   said strained first sections have a high optical mode coupling coefficient and comprise a crystalline semiconductor material,
   said second sections have a non-reversed but lower optical mode coupling coefficient relative to the strained first sections, and
   a period of said first and second sections is a multiple of an inverse of a difference between a pump wavevector and a sum of signal and idler wavevectors in the waveguide.

2. The phase matched strained semiconductor waveguide as claimed in claim 1, wherein the semiconductor waveguide body comprises silicon.

3. The phase matched strained semiconductor waveguide as claimed in claim 2, wherein the semiconductor waveguide body comprises a body suspended over an air gap in an insulating substrate to form a silicon-on-insulator waveguide structure.

4. The phase matched strained semiconductor waveguide as claimed in claim 3, comprising a stress-inducing material formed on at least the first sections to induce a strain in the first sections.

5. The phase matched strained semiconductor waveguide as claimed in claim 4, wherein the stress-inducing material comprises silicon nitride.

6. The phase matched strained semiconductor waveguide as claimed in claim 4, wherein said first sections comprise a crystalline silicon and said second sections comprise an amorphous silicon.

7. The phase matched strained semiconductor waveguide as claimed in claim 3, wherein the strain is induced by suspending the waveguide body in a high-stress membrane over the air gap.

8. The phase matched strained semiconductor waveguide as claimed in claim 7, wherein the high-stress membrane comprises a silicon nitride membrane.

9. The phase matched strained semiconductor waveguide as claimed in claim 2, wherein the semiconductor waveguide body comprises a body formed on an optically transparent substrate, wherein a lattice and/or thermal mismatch between the crystalline semiconductor material of the first sections and the optically transparent substrate induces strain in the semiconductor waveguide.

10. The phase matched strained semiconductor waveguide as claimed in claim 9, wherein the optically transparent substrate comprises sapphire to form a silicon-on-sapphire structure.

11. The phase matched strained semiconductor waveguide as claimed in claim 10, comprising a high-stress layer formed on the high-stress sections, wherein strain in the first sections is increased by the high-stress layer formed on the high-stress sections.

12. The phase matched strained semiconductor waveguide as claimed in claim 9, wherein the first sections comprise a crystalline silicon and the second sections comprise an amorphous silicon.

13. The phase matched strained semiconductor waveguide as claimed in claim 12 comprising a high-stress layer formed on at least the crystalline silicon, wherein strain in the first sections is increased by the high-stress layer formed on at least the crystalline silicon.

14. The phase matched strained semiconductor waveguide as claimed in claim 13, wherein the high-stress layer comprises a silicon nitride layer.

15. The phase matched strained semiconductor waveguide as claimed in claim 2, wherein the semiconductor waveguide body comprises germanium, and the waveguide further comprises a substrate on which the germanium waveguide body is formed, wherein strain is induced by a lattice and/or thermal mismatch between the germanium waveguide body and the substrate on which the germanium waveguide body is formed.

16. The phase matched strained semiconductor waveguide as claimed in claim 15, wherein the substrate comprises a silicon substrate.

17. A phase matched strained semiconductor waveguide as claimed in claim 15, further comprising a stress-inducing layer formed on the germanium waveguide body, the stress-inducing layer inducing a strain in at least the first sections in addition to strain induced by the lattice and/or thermal mismatch between the germanium waveguide body and the substrate.

18. The phase matched strained semiconductor waveguide as claimed in claim 17, wherein the stress-inducing layer comprises a silicon nitride layer.

19. The phase matched strained semiconductor waveguide as claimed in claim 15, wherein said first sections comprise a crystalline germanium and said second sections comprise an amorphous germanium.

20. A phase matched strained semiconductor waveguide comprising as claimed in claim 19 comprising a high-stress layer formed on at least the crystalline germanium, wherein strain in the first sections is increased by the high-stress layer formed on at least the crystalline germanium.

21. The phase matched strained semiconductor waveguide as claimed in claim 20, wherein the high-stress layer comprises a silicon nitride layer.

22. A phase matched strained semiconductor waveguide that exhibits second order effects, comprising:
 a semiconductor waveguide body having a plurality of periodically alternating first and second sections and an induced strain, wherein:
 the silicon waveguide body is corrugated to have alternating first and second sections of different width, and
 a poling period of the first and second sections is a multiple of an inverse of a difference between a pump wavevector and a sum of signal and idler wavevectors in the waveguide.

23. The phase matched strained semiconductor waveguide as claimed in claim 22, wherein the semiconductor waveguide body comprises silicon.

24. The phase matched strained semiconductor waveguide as claimed in claim 23 comprising a stress-inducing material formed on the corrugated semiconductor waveguide body to induce the strain.

25. The phase matched strained semiconductor waveguide as claimed in claim 23 further comprising a substrate, wherein the strain is induced in the corrugated silicon waveguide body by a lattice and/or thermal mismatch between the silicon waveguide body and the substrate.

26. The phase matched strained semiconductor waveguide as claimed in claim 25, wherein the substrate comprises a sapphire substrate.

27. The phase matched strained semiconductor waveguide as claimed in claim 22, wherein the semiconductor waveguide body comprises germanium.

28. The phase matched strained semiconductor waveguide as claimed in claim 27 comprising a substrate, wherein strain is induced in the semiconductor by a lattice and/or thermal mismatch between the germanium waveguide body and the substrate.

29. The phase matched strained semiconductor waveguide as claimed in claim 28, wherein the substrate comprises a silicon substrate.

30. A method of producing strain in a semiconductor waveguide comprising the steps of:
 forming a semiconductor waveguide body comprising a plurality of alternating strained first sections and second sections with a periodicity that is a multiple of an inverse of a difference between a pump wavevector and a sum of signal and idler wavevectors in the waveguide, wherein:
 said strained first sections comprise a crystalline semiconductor material having a high optical mode coupling coefficient, and
 said second sections comprise a material having a non-reversed but lower optical mode coupling coefficient relative to the strained first sections.

31. The method as claimed in claim 30, further comprising the step of inducing strain in the first sections by applying a high-stress material to at least the first sections.

32. The method as claimed in claim 30, further comprising the step of inducing strain in the first sections by forming the waveguide body on a substrate having a lattice and/or thermal mismatch with the waveguide body.

33. The method as claimed in claim 30, further comprising the step of inducing additional strain in the first sections by applying a high-stress material to at least the first sections.

34. The method as claimed in claim 30 comprising forming said second sections by forming gaps in the crystalline semiconductor material and forming an amorphous semiconductor material in the gaps.

35. A method of producing strain in a semiconductor waveguide comprising the steps of:
 forming a corrugated semiconductor waveguide body comprising a plurality of corrugated sections having a periodicity that is a multiple of an inverse of a difference between a pump wavevector and a sum of signal and idler wavevectors in the waveguide, and
 inducing a strain in the corrugated semiconductor waveguide body.

36. The method as claimed in claim 35 comprising inducing strain by forming the corrugated semiconductor waveguide body on or in a membrane of high-stress material.

37. The method as claimed in claim 35 comprising inducing strain by forming the corrugated semiconductor waveguide body on or in a membrane of material having a lattice and/or thermal mismatch with the material of the corrugated semiconductor waveguide body.

* * * * *

UNITED STATES PATENT AND TRADEMARK OFFICE
CERTIFICATE OF CORRECTION

| | | |
|---|---|---|
| PATENT NO. | : 9,261,647 B1 | Page 1 of 1 |
| APPLICATION NO. | : 14/012877 | |
| DATED | : February 16, 2016 | |
| INVENTOR(S) | : Cox et al. | |

It is certified that error appears in the above-identified patent and that said Letters Patent is hereby corrected as shown below:

On the Title page of the Patent, in column 1, item "(72) Inventors", line 1, please delete the word "Johathan" and insert the word --Jonathan--.

Signed and Sealed this
Tenth Day of May, 2016

Michelle K. Lee
*Director of the United States Patent and Trademark Office*